US012110837B2

(12) United States Patent
Schneider

(10) Patent No.: US 12,110,837 B2
(45) Date of Patent: *Oct. 8, 2024

(54) INSULATION LAYER ON STEEL PISTONS

(71) Applicant: Tenneco Inc., Lake Forest, IL (US)

(72) Inventor: Norbert G. Schneider, Ann Arbor, MI (US)

(73) Assignee: Tenneco Inc., Lake Forest, IL (US)

( * ) Notice: Subject to any disclaimer, the term of this patent is extended or adjusted under 35 U.S.C. 154(b) by 392 days.

This patent is subject to a terminal disclaimer.

(21) Appl. No.: 16/354,959

(22) Filed: Mar. 15, 2019

(65) Prior Publication Data

US 2019/0211774 A1 Jul. 11, 2019

Related U.S. Application Data

(63) Continuation of application No. 15/436,966, filed on Feb. 20, 2017, now Pat. No. 10,273,902.

(Continued)

(51) Int. Cl.
*F02F 3/10* (2006.01)
*C04B 35/48* (2006.01)
(Continued)

(52) U.S. Cl.
CPC ............... *F02F 3/10* (2013.01); *C04B 35/48* (2013.01); *C04B 35/486* (2013.01);
(Continued)

(58) Field of Classification Search
CPC ........ F02F 3/12; F02F 3/14; F02F 3/10; F02F 3/0092; F02F 3/26; F02F 2003/0007;
(Continued)

(56) References Cited

U.S. PATENT DOCUMENTS 2,978,360 A * 4/1961 Bradstreet ................. F01N 3/08
123/669
5,304,519 A * 4/1994 Jackson ................. C21D 9/563
501/106

(Continued)

FOREIGN PATENT DOCUMENTS

DE 102014211366 A1 12/2014
GB 2307193 A 5/1997
(Continued)

OTHER PUBLICATIONS

English machine translation of Description from Espacenet for JP 09268304 A (Year: 2021).*

(Continued)

*Primary Examiner* — Scott A Reinbold
(74) *Attorney, Agent, or Firm* — Robert L. Stearns; Dickinson Wright PLLC

(57) ABSTRACT

A steel piston designed to improve thermal efficiency, fuel consumption, and performance of an engine is provided. The piston includes a steel body portion and a thermal barrier layer applied to an upper combustion surface and/or a ring belt to reduce the amount of heat transferred from a combustion chamber to the body portion. The thermal barrier layer has a thermal conductivity which is lower than a thermal conductivity of the steel body portion. The thermal barrier layer typically includes a ceramic material, for example ceria, ceria stabilized zirconia, and/or a mixture of ceria stabilized zirconia and yttria stabilized zirconia in an amount of 90 to 100 wt. %, based on the total weight of the ceramic material. The thermal barrier layer can also have a gradient structure which gradually transitions from 100 wt. % of a metal bond material to 100 wt. % of the ceramic material.

10 Claims, 2 Drawing Sheets

Related U.S. Application Data

(60) Provisional application No. 62/298,024, filed on Feb. 22, 2016.

(51) Int. Cl.

| | | |
|---|---|---|
| *C04B 35/486* | (2006.01) | |
| *C04B 35/622* | (2006.01) | |
| *C23C 4/02* | (2006.01) | |
| *C23C 4/06* | (2016.01) | |
| *C23C 4/08* | (2016.01) | |
| *C23C 4/11* | (2016.01) | |
| *C23C 4/12* | (2016.01) | |
| *C23C 4/126* | (2016.01) | |
| *C23C 4/129* | (2016.01) | |
| *C23C 4/134* | (2016.01) | |
| *C23C 28/00* | (2006.01) | |
| *F02B 77/02* | (2006.01) | |
| *F02F 3/00* | (2006.01) | |
| *F02F 3/12* | (2006.01) | |
| *F02F 3/26* | (2006.01) | |

(52) U.S. Cl.
CPC ......... *C04B 35/62222* (2013.01); *C23C 4/02* (2013.01); *C23C 4/06* (2013.01); *C23C 4/08* (2013.01); *C23C 4/11* (2016.01); *C23C 4/12* (2013.01); *C23C 4/126* (2016.01); *C23C 4/129* (2016.01); *C23C 4/134* (2016.01); *C23C 28/321* (2013.01); *C23C 28/345* (2013.01); *C23C 28/3455* (2013.01); *C23C 28/36* (2013.01); *F02B 77/02* (2013.01); *F02F 3/0092* (2013.01); *F02F 3/12* (2013.01); *F02F 3/26* (2013.01); *C04B 2235/3225* (2013.01); *C04B 2235/3229* (2013.01); *C04B 2235/9607* (2013.01); *F02F 2003/0007* (2013.01); *F02F 2200/06* (2013.01); *F05C 2251/042* (2013.01); *F05C 2251/048* (2013.01); *F05C 2253/12* (2013.01)

(58) Field of Classification Search
CPC ....... F02F 2200/06; F02B 77/02; F02B 77/11; C04B 35/48; C04B 2235/3225; C04B 2235/3229; C04B 35/486; C04B 35/62222; C04B 2235/9607; C23C 4/02; C23C 4/06; C23C 4/08; C23C 4/11; C23C 4/12; C23C 4/126; C23C 4/129; C23C 4/134; C23C 28/321; C23C 28/345; C23C 28/3455; C23C 28/36; F05C 2251/042; F05C 2251/048; F05C 2253/12
USPC ..................................... 123/193.6
See application file for complete search history.

(56) References Cited

U.S. PATENT DOCUMENTS

| | | | |
|---|---|---|---|
| 5,320,909 A | 6/1994 | Scharman et al. | |
| 5,384,200 A | 1/1995 | Giles et al. | |
| 5,722,379 A | 3/1998 | Binder et al. | |
| 10,995,661 B2* | 5/2021 | Lineton | C23C 28/3215 |
| 11,111,851 B2* | 9/2021 | Lineton | F01L 3/04 |
| 2003/0051714 A1* | 3/2003 | Bedwell | F02F 3/10 |
| | | | 123/670 |
| 2009/0317767 A1* | 12/2009 | Burger | C04B 35/6455 |
| | | | 623/20.14 |
| 2010/0227146 A1* | 9/2010 | Larose | C23C 4/11 |
| | | | 428/220 |
| 2013/0025561 A1* | 1/2013 | Gabriel | C23C 4/08 |
| | | | 123/193.6 |
| 2013/0118438 A1* | 5/2013 | Lineton | F02F 3/14 |
| | | | 123/193.6 |
| 2013/0180494 A1* | 7/2013 | Aharonov | F02F 3/10 |
| | | | 123/193.6 |
| 2015/0122212 A1* | 5/2015 | Riffe | F02F 3/16 |
| | | | 123/193.4 |
| 2015/0204269 A1 | 7/2015 | Hiratsuka et al. | |
| 2016/0138516 A1* | 5/2016 | Moding | C23C 4/11 |
| | | | 148/287 |
| 2016/0273483 A1* | 9/2016 | Yamashita | F02F 3/10 |
| 2017/0145952 A1* | 5/2017 | Lineton | C23C 4/11 |

FOREIGN PATENT DOCUMENTS

| | | | |
|---|---|---|---|
| JP | S6139454 U | | 3/1986 |
| JP | H09209830 A | | 8/1997 |
| JP | 09268304 A | * | 10/1997 |
| JP | H09268304 A | | 10/1997 |
| JP | 2012246802 A | | 12/2012 |
| JP | 2014020300 A | | 2/2014 |
| WO | 9324672 A1 | | 12/1993 |
| WO | 2014024494 A | | 2/2014 |

OTHER PUBLICATIONS

Pdf of web article published by New Atlas, "Mercedes introduces hi-tech pistons made from steel," site visited Aug. 16, 2021. (Year: 2014).*

Pdf of https://www.engineeringtoolbox.com/linear-expansion-coefficients-d_95.html. (Year: 2021).* https://www.motortrend.com/features/1211dp-aluminum-vs-steel-diesel-engine-pistons/, retrieved from web Feb. 28, 2022 (Year: 2021).*

International Search Report, mailed Jun. 7, 2017 (PCT/US2017/018614).

* cited by examiner

INSULATION LAYER ON STEEL PISTONS

CROSS-REFERENCE TO RELATED APPLICATIONS

This U.S. continuation patent application claims priority to U.S. utility patent application Ser. No. 15/436,966, filed Feb. 20, 2017, which claims priority to U.S. provisional patent application No. 62/298,024, filed Feb. 22, 2016, the contents of which are incorporated herein by reference in their entirety.

BACKGROUND OF THE INVENTION

1. Technical Field

This invention relates generally to pistons for internal combustion engines, and methods of manufacturing the pistons.

2. Related Art

Engine manufacturers are encountering increasing demands to improve engine efficiencies and performance, including, but not limited to, improving fuel economy, reducing oil consumption, improving fuel systems, increasing compression loads and operating temperatures within the cylinder bores, reducing heat loss through the piston, improving lubrication of component parts, decreasing engine weight and making engines more compact, while at the same time decreasing the costs associated with manufacture.

While desirable to increase the compression load and operation temperature within the combustion chamber, it remains necessary to maintain the temperature of the piston within workable limits. Accordingly, although desirable to increase the compression load and operation temperature within the combustion chamber, achieving this goal comes with a tradeoff in that these desirable "increases" limit the degree to which the piston compression height, and thus, overall piston size and mass can be decreased. This is particularly troublesome with typical piston constructions having a closed or partially closed cooling gallery to reduce the operating temperature of the piston. The cost to manufacture pistons having upper and lower parts joined together along a bond joint to form the closed or partially closed cooling gallery is generally increased due to the joining process used to bond the upper and lower parts together. Further, the degree to which the engine weight can be reduced is impacted by the need to make the aforementioned "cooling gallery-containing" pistons from steel so they can withstand the increase in mechanical and thermal loads imposed on the piston.

Recently, single piece steel pistons without a cooling gallery have been developed and can be referred to as "galleryless" pistons. Such pistons provide for reduced weight, reduced manufacturing costs, and reduced compression height. The galleryless pistons are either spray cooled by a cooling oil nozzle, lightly sprayed for lubrication only, or are not sprayed with any oil. Due to the absence of the cooling gallery, such pistons typically experience higher temperatures than pistons with a conventional cooling gallery. High temperatures can cause oxidation or overheating of an upper combustion surface of the steel piston, which can then cause successive piston cracking and could cause engine failure. High temperatures can also cause oil degradation along an undercrown area of the piston, for example underneath a combustion bowl where the cooling or lubrication oil is sprayed. Another potential problem arising due to high temperatures is that the cooling oil can create a thick layer of carbon in the area where the cooling or lubrication oil is in contact with the piston undercrown. This carbon layer can cause overheating of the piston with potential cracking and thus possible engine failure. However, it is also recognized that high surface temperatures of the piston can increase the thermal efficiency of the engine, allowing better fuel consumption of the engine.

SUMMARY OF THE INVENTION

One aspect of the invention provides a steel piston for an internal combustion engine which is designed to improve thermal efficiency, fuel consumption, and performance of the engine. The piston includes a body portion formed of steel. The body portion includes an upper wall including an undercrown surface, and the upper wall includes an upper combustion surface opposite the undercrown surface. A ring belt depends from the upper wall and extends circumferentially around a central longitudinal axis of the piston, a pair of pin bosses depend from the upper wall, and a pair of skirt panels depend from the ring belt and are coupled to the pin bosses. A thermal barrier layer is applied to at least a portion of the upper combustion surface and/or at least a portion of the ring belt to prevent heat from the combustion chamber from entering the steel body portion of the piston, and the thermal barrier layer has a thermal conductivity which is lower than a thermal conductivity of the steel of the body portion.

Another aspect of the invention provides a method of manufacturing a piston. The method includes applying a thermal barrier layer to at least a portion of an upper combustion surface and/or at least a portion of a ring belt of a body portion of a piston. The body portion of the piston is formed of steel, and the thermal barrier layer has a thermal conductivity which is lower than a thermal conductivity of the steel of the body portion. The body portion includes an upper wall including the upper combustion surface and an undercrown surface. The ring belt depends from the upper wall and extends circumferentially around a central longitudinal axis of the piston, a pair of pin bosses depend from the upper wall, and a pair of skirt panels depend from the ring belt and are coupled to the pin bosses.

BRIEF DESCRIPTION OF THE DRAWINGS

These and other aspects, features and advantages of the invention will become more readily appreciated when considered in connection with the following detailed description and accompanying drawings, in which.

DETAILED DESCRIPTION OF EXEMPLARY EMBODIMENTS

Figure 1:
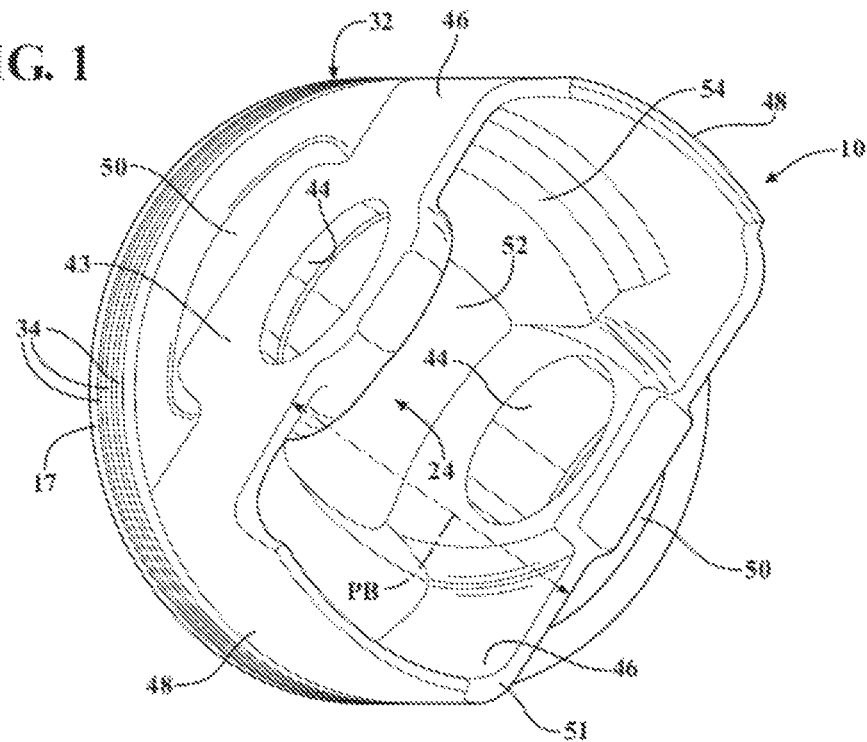
FIG. 1 is a bottom perspective view of a piston constructed in accordance with an example embodiment of the invention.
Figure 2:
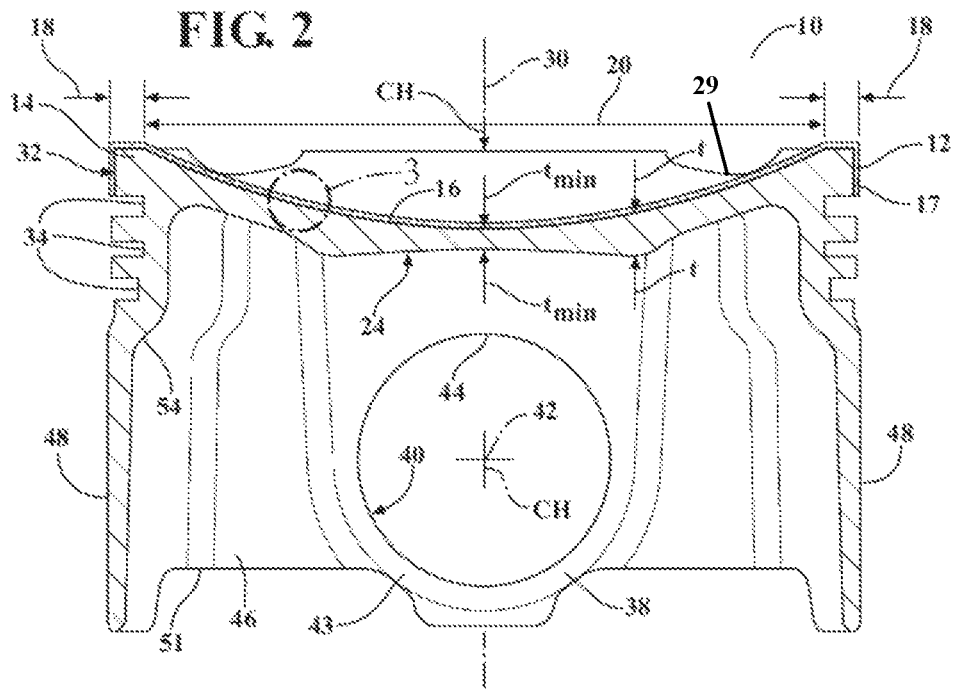
FIG. 2 is a cross-sectional view taken generally transversely to a pin bore axis of a piston in accordance with an example embodiment of the invention.
Figure 3:
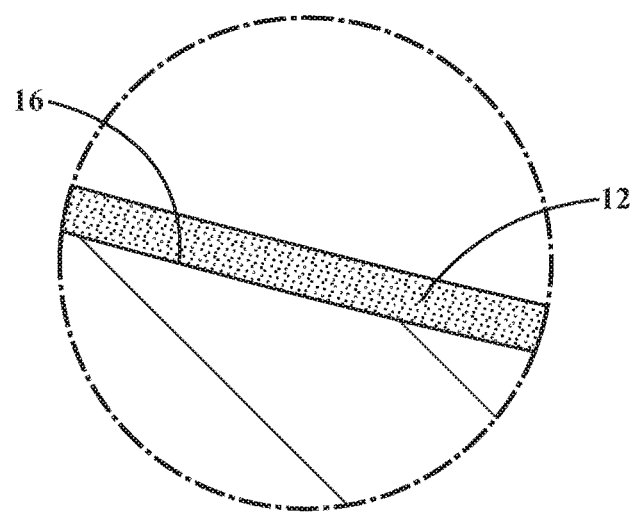
FIG. 3 is an enlarged view of a portion of FIG. 2 illustrating a thermal barrier layer applied to an upper combustion surface of the piston.

FIGS. 1 and 2 illustrate views of a piston 10 constructed in accordance with example embodiments of the invention for reciprocating movement in a cylinder bore or chamber (not shown) of an internal combustion engine, such as a modern, compact, high performance vehicle engine, for example. As shown in FIG. 3, a thermal barrier layer 12, also referred to as an insulation layer, is applied to an upper combustion surface 16 of the piston 10 to improve thermal efficiency, fuel consumption, and performance of the engine.

The piston 10 is constructed having a monolithic body formed from a single piece of steel material, such as via machining, forging or casting, with possible finish machining performed thereafter, if desired, to complete construction. Accordingly, the piston 10 does not have a plurality of parts joined together, such as upper and lower parts joined to one another, which is commonplace with pistons having enclosed or partially enclosed cooling galleries bounded or partially bounded by a cooling gallery floor. To the contrary, the piston 10 is "galleryless" in that it does not have a cooling gallery floor or other features bounding or partially bounding a cooling gallery. The body portion, being made of steel, is strong and durable to meet the high performance demands, i.e. increased temperature and compression loads, of modern day high performance internal combustion engines. The steel material used to construct the body can be an alloy such as the SAE 4140 grade or different, depending on the requirements of the piston 10 in the particular engine application. Due to the piston 10 being galleryless, the weight and compression height (CH) of the piston 10 is minimized, thereby allowing an engine in which the piston 10 is deployed to achieve a reduced weight and to be made more compact. Further yet, even though the piston 10 is galleryless, the piston 10 can be sufficiently cooled during use to withstand the most severe operating temperatures, or alternatively be used without oil cooling.

The body portion of the piston 10 has an upper head or top section providing an upper wall 14, which provides the upper combustion surface 16 that is directly exposed to combustion gasses within the cylinder bore of the internal combustion engine from an underside of the piston 10. In the example embodiment, the upper combustion surface 16 includes an annular first portion 18 formed as a substantially planar surface extending along an outer periphery of the upper wall 14 and a second portion 20 forming a combustion bowl. The second portion 20 of the upper combustion surface 16, which forms the combustion bowl, typically has a non-planar, concave, or undulating surface that depends from the planar first portion 18.

The piston 10 also includes an undercrown surface 24 formed on an underside of the upper wall 14, directly opposite the second portion 20 of the upper combustion surface 16 and radially inwardly of the ring belt 32. The undercrown surface 14 is preferably located at a minimum distance from the combustion bowl and is substantially the surface on the direct opposite side from the combustion bowl. The undercrown surface 24 is defined here to be the surface that is visible, excluding the pin bores 40, when observing the piston 10 straight on from the bottom. The undercrown surface 24 is also exposed from an underside of the piston 10. The undercrown surface 24 is generally form fitting to the combustion bowl of the upper combustion surface 16. The undercrown surface 24 is also openly exposed, as viewed from an underside of the piston 10, and it is not bounded by an enclosed or partially enclosed cooling gallery, or any other features tending to retain oil or a cooling fluid near the undercrown surface 24. Since the piston 10 is free of a cooling gallery along the undercrown surface 24, the weight and related costs of the piston 10 are reduced, relative to pistons including a closed cooling gallery.

In the example embodiment, wherein the piston 10 is designed for a diesel engine, the annular first portion 18 of the upper wall 14 forms an outer periphery of the upper wall 14 and surrounds the second portion forming the combustion bowl, which depends therefrom. Thus, in the example embodiment, the second portion 20, including the combustion bowl, is recessed below the uppermost first portion 18 of the upper combustion surface 16. The combustion bowl of the second portion 20 also extends continuously through a central axis 30 and across the entire diameter of the piston 10, between opposite sides of the annular first portion 18. In the example embodiment, the combustion bowl comprises a concave surface extending continuously between the opposite sides of the annular first portion 18. Alternatively, the combustion bowl wall can be contoured, for example to provide an upper apex, also referred to as center peak (not shown), which may lie coaxially along the central axis 30 of the piston 10, or may be axially offset relative to the piston central axis 30. According to another embodiment, the first portion 18 is below the second portion 20, and the second portion 20 is bulged upwards and convex. This design could be used in a natural gas engine, or any other type of engine.

The top section of the piston 10 further includes a ring belt 32 that depends from the upper combustion surface 16 to provide an upper land 17 and one or more ring grooves 34 for receipt of one or more corresponding piston rings (not shown). The upper land 17 extends from the upper combustion surface 16 to an uppermost one of the ring grooves 34. In the example embodiments, at least one valve pocket 29 having a curved profile is formed in the annular first portion 18 of the upper wall 14.

The piston 10 further includes a bottom section including a pair of pin bosses 38 depending generally from the upper wall 14. The pin bosses 38 each have a pin bore 40, preferably bushingless given the steel construction, wherein the pin bores 40 are laterally spaced from one another coaxially along a pin bore axis 42 that extends generally transversely to the central longitudinal axis 30. The pin bosses 38 have generally flat, radially outermost surfaces, referred to as outer faces 43, that are spaced from one another along the pin bore axis 40 a distance PB, shown as being generally parallel with one another. The PB dimension is minimized, thereby maximizing an exposed area of a recessed, generally cup-shaped region, referred to hereafter as undercrown pockets 50. The undercrown pockets 50 are located radially outwardly of the pin bosses 38 and at least a portion of each pocket 50 forms a portion of the undercrown surface 24. In the example embodiment, the portions of the undercrown pockets 50 forming the portion of the undercrown surface 24 are located opposite the second portion 20 of the upper combustion surface 16 and radially inwardly of the ring belt 32. The undercrown pockets 50 also extend radially outwardly beyond the undercrown surface 24 along an underside surface of the annular first portion 18 of the upper combustion surface 16 and depend from the upper wall 14 along an inner surface of the ring belt 32.

With the 2-dimensional and 3-dimensional surface area of the pockets 50 being maximized, at least in part due to the minimized distance PB, cooling caused by oil splashing or being sprayed upwardly from the crankcase against the exposed surface of the undercrown pockets 50 can be enhanced, thereby lending to further cooling of the upper combustion surface 16, the undercrown surface 24, as well as a portion of the ring belt 34.

Figure 4:
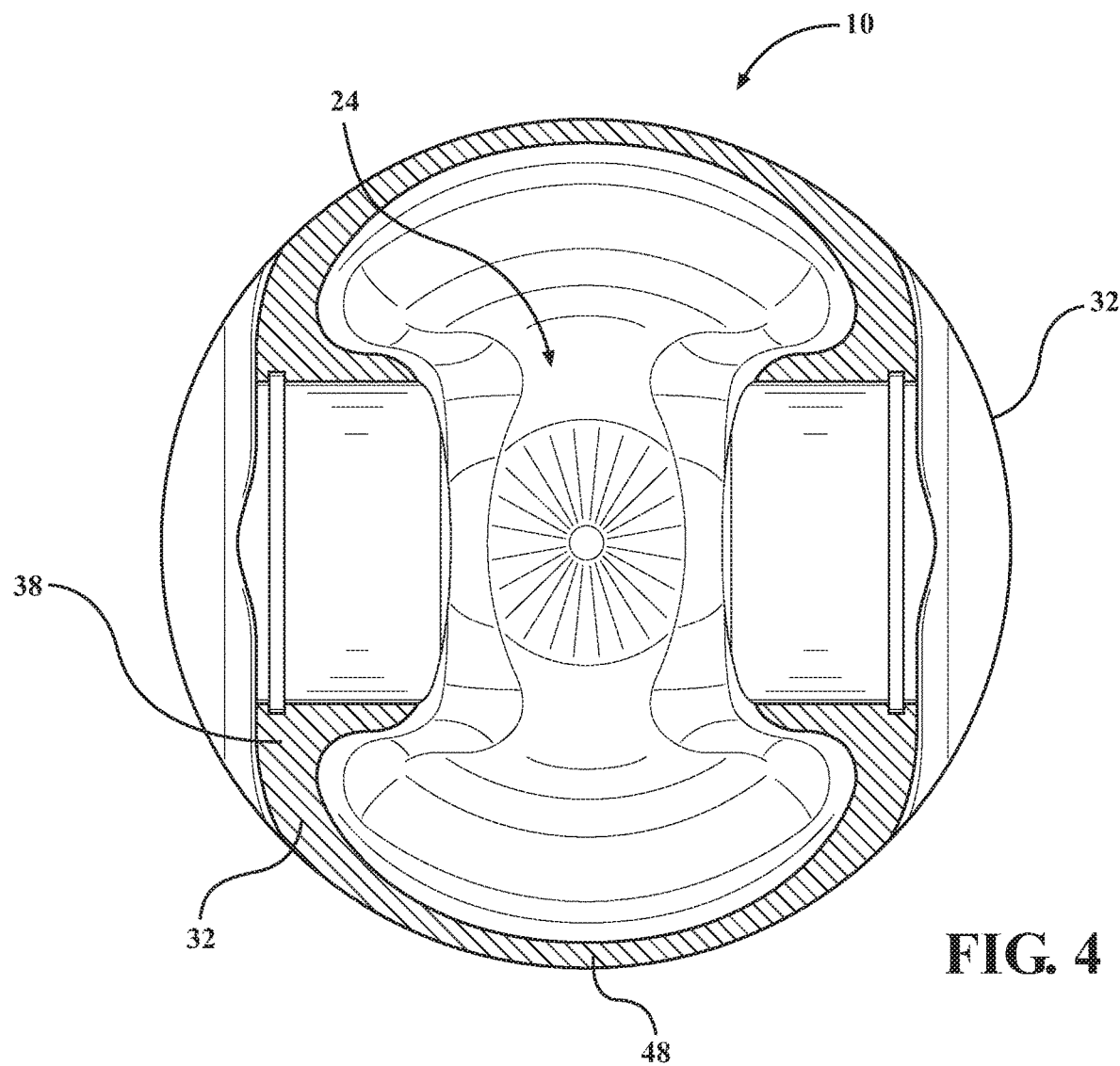
FIG. 4 is an example of a piston constructed in accordance with another embodiment of the invention, wherein the piston does not include undercrown pockets.

Although the pistons 10 of the example embodiments of FIGS. 1 and 2 include the undercrown pockets 50, the piston 10 could alternatively be designed without the undercrown pockets 50. An example of the piston 10 without the undercrown pockets 50 is shown in FIG. 4.

The pin bores 40 each have a concave uppermost load bearing surface, referred to hereafter as uppermost surface 44, disposed near the ring belt 32. As such, the compression height CH is minimized (the compression height is the dimension extending from the pin bore axis 42 to the annular first portion 18 of the upper combustion surface 16). The pin bosses 38 are joined via outer panels, also referred to as struts 46, to diametrically opposite skirt panels, also referred to as skirt panels 48.

The pin bosses 38, skirt panels 48 and struts 46 bound an inner undercrown region which extends along the undercrown surface 24 and from a lowermost or bottom surface 51 of the struts 46 and skirt panels 48 to the undercrown surface 24. In the example embodiments of FIGS. 1 and 2, no ribs are located along the undercrown surface 24, along the pin bosses 38, along the skirt panels 48, or along the struts 46 in the open region. In addition, no closed or partially closed cooling gallery is formed in the open region. However, the piston 10 can include a stepped region 54 along the uppermost edge of each skirt panel 48 adjacent the undercrown surface 24, as identified in FIGS. 1 and 2.

The undercrown surface 24 of the piston 10 has greater a total surface area (3-dimensional area following the contour of the surface) and a greater projected surface area (2-dimensional area, planar, as seen in plan view) than comparative pistons having a closed or partially closed cooling gallery. This open region along the underside of the piston 10 provides direct access to oil splashing or being sprayed from within the crankcase directly onto the undercrown surface 24, thereby allowing the entire undercrown surface 24 to be splashed directly by oil from within the crankcase, while also allowing the oil to freely splash about the wrist pin (not shown), and further, significantly reduce the weight of the piston 10. Accordingly, although not having a typical closed or partially closed cooling gallery, the generally open configuration of the galleryless piston 10 allows optimal cooling of the undercrown surface 24 and lubrication to the wrist pin joint within the pin bores 40, while at the same time reducing oil residence time on the surfaces near the combustion bowl, which is the time in which a volume of oil remains on the surface. The reduced residence time can reduce unwanted build-up of coked oil, such as can occur in pistons having a closed or substantially closed cooling gallery. As such, in certain applications, the piston 10 can remain "clean" over extended use, thereby allowing it to remain substantially free of build-up.

Another significant aspect of the example piston 10 shown in FIGS. 1 and 2 is that at least a center portion 52 of the undercrown surface 24 of the piston 10 disposed between the opposite skirt panels 38 and the opposite pin bosses 38 is concave in form, when viewing from the bottom of the piston 10. As such, oil can be channeled during reciprocation of the piston 10 from one side of the piston 10 to the opposite side of the piston 10, thereby acting to further enhance cooling of the piston 10. Alternatively, the piston 10 can be maintained at acceptable temperatures when used in an internal combustion engine without the use of cooling oil.

The piston 10 also includes the thermal barrier layer 12 applied to the upper combustion surface 16 and/or the upper land 17, up to, but not including, the uppermost ring groove 34. The upper combustion surface 16 and the upper land 17 to which the thermal barrier layer 12 is applied are both exposed to the combustion chamber of the engine. The thermal barrier layer 12 can cover the entire upper combustion surface 16 and upper land 17, as shown in FIG. 1, or just certain areas of the upper combustion surface 16 and/or certain areas of the upper land 17. The thermal barrier layer 12 can reduce oxidation of the upper combustion surface 16, as well as oil degradation and a thick layer of carbon along the undercrown surface 24 or area of the undercrown pockets 50. It is noted that the thermal barrier layer 12 also affects the temperature of the area of the undercrown pockets 50. The thermal barrier layer 12 can also increase the thermal efficiency of the piston 10 and provide for better fuel consumption of the engine.

At least a portion of the thermal barrier layer 12 has a thermal conductivity which is lower than a thermal conductivity of the steel used to form the body portion of the piston 10. Various different compositions can be used to form the thermal barrier layer 12.

In one example embodiment, the thermal barrier layer 12 includes a ceramic material, specifically at least one of ceria, ceria stabilized zirconia, and a mixture of ceria stabilized zirconia and yttria stabilized zirconia. The ceramic material has a low thermal conductivity, such as less than 1 W/m·K. The ceria used in the ceramic material makes the layer 12 more stable under the high temperatures, pressures, and other harsh conditions of the engine. The composition of the ceramic material also makes it less susceptible to chemical attack than other ceramic coatings, such as coatings formed of yttria stabilized zirconia, which can suffer destabilization through thermal effects and chemical attack in diesel combustion engines. Ceria and ceria stabilized zirconia are much more stable under such thermal and chemical conditions. Ceria has a thermal expansion coefficient which is similar to the steel material used to form the piston body portion. The thermal expansion coefficient of ceria at room temperature (21° C.) ranges from 10E-6 to 11E-6, and the thermal expansion coefficient of steel at room temperature (21° C.) ranges from 11E-6 to 14E-6. The similar thermal expansion coefficients help to avoid thermal mismatches that produce stress cracks.

In one embodiment, the ceramic material used to form the thermal barrier layer 12 includes ceria in an amount of 90 to 100 wt. %, based on the total weight of the ceramic material. In another example embodiment, the ceramic material includes ceria stabilized zirconia in an amount of 90 to 100 wt. %, based on the total weight of the ceramic material. In yet another example embodiment, the ceramic material includes ceria/yttria stabilized zirconia in an amount of 90 to 100 wt. %, based on the total weight of the ceramic material. In this embodiment, about 50 wt. % of the zirconia is stabilized by ceria and about 50 wt. % of the zirconia is stabilized by yttria, based on the total weight of the ceramic material.

The thermal barrier layer 12 can be applied in a gradient structure to avoid discrete metal/ceramic interfaces. The gradient structure helps to mitigate stress build up through thermal mismatches and reduces the tendency to form a continuous weak oxide boundary layer at the bond material/ceramic interface. In other words, the gradient structure avoids sharp interfaces. Thus, the thermal barrier layer 12 is less likely to de-bond during service.

The gradient structure of the thermal barrier layer 12 is formed by first applying a metal bond material to the upper combustion surface 16 and/or upper land 17. The composition of the metal bond material can be the same as the material used to form the piston body portion, for example a steel powder. Alternatively the metal bond material can comprise a high performance superalloy, such as those used in coatings of jet turbines. The gradient structure is formed by gradually transitioning from 100% metal bond material to 100% ceramic material. The thermal barrier layer 12 includes the metal bond material applied to the upper combustion surface 16 and/or upper land 17, followed by increasing amounts of the ceramic material and reduced amounts of the metal bond material. The uppermost portion of the thermal barrier layer 12 is formed entirely of the ceramic material. The metal bond material typically consists of the metal in an amount of 100 wt. %, based on the total weight of the metal bond material, and the ceramic material typically consists of the ceramic in an amount of 100 wt. %, based on the total weight of the ceramic material. Typically, when the thermal barrier layer 12 includes the gradient structure, the layer 12 consists only of the metal bond material and the ceramic material.

The thermal barrier layer 12 has been found to adhere well to the steel piston body portion. However, for additional mechanical anchoring, broken edges, such as pockets, recesses, rounded edges, and/or chamfers can be machined along at least portions of the upper combustion surface 16 and/or upper land 17. These features help to avoid stress concentrations in the thermal barrier layer 12 and avoid sharp corners or edges that could cause failure of the layer 12. The machined pockets or recesses mechanically lock the thermal barrier layer 12 in place, again reducing the probability of delamination failure.

Another aspect of the invention provides a method of manufacturing the coated galleryless piston 10 for use in the internal combustion engine. The body portion of the piston 10, which is typically formed of steel, can be manufactured according to various different methods, such as forging or casting. The body portion of the galleryless piston 10 can also comprise various different designs, examples of the designs are shown in the Figures.

The method further includes applying the thermal barrier layer 12 to at least a portion of the upper combustion surface 16 and/or at least a portion of the upper land 17 of the piston 10. Various different methods can be used to apply the thermal barrier layer 12. For example, the thermal barrier layer 12 can be spray coated, plated, cast, or in any way permanently attached the steel body portion of the piston 10.

In one embodiment, the thermal barrier layer 12 is applied by thermal spraying. For example, the method can include applying the metal bond material and the ceramic material by a thermal spray technique, such as plasma spraying. High velocity Oxy-Fuel (HVOF) spraying is an alternative that gives a denser layer 12, but it is a more expensive process. Other methods of applying the thermal barrier layer 12 to the piston 10 can also be used.

The example method begins by spraying the metal bond material in an amount of 100 wt. % and the ceramic material in an amount of 0 wt. %, based on the total weight of the layer 12. Throughout the spraying process, an increasing amount of ceramic material is added to the composition, while the amount of metal bond material is reduced. Thus, the composition of the thermal barrier layer 12 gradually changes from 100 wt. % metal bond material at the piston body portion to 100 wt. % ceramic material, based on the total weight of the thermal barrier layer 12, at the outermost surface of the layer 12. Multiple powder feeders are typically used to apply the thermal barrier layer 12, and their feed rates are adjusted to achieve the gradient structure. The thermal barrier layer 12 is preferably applied to a thickness of less than 500 microns. The gradient structure of the thermal barrier layer 12 is achieved during the thermal spray process.

Prior to applying the thermal barrier layer 12, the broken edges or features that aid in mechanical locking and reduce stress risers are machined into the steel body portion of the piston 10, for example by turning, milling or any other appropriate means. The upper combustion surface 16 and/or upper land 17 is then washed in solvent to remove contamination. The method can also include grit blasting the surfaces of the piston body portion to improve adhesion of the thermal barrier layer 12.

Many modifications and variations of the present invention are possible in light of the above teachings and may be practiced otherwise than as specifically described while within the scope of the claims. It is contemplated that all features of all claims and of all embodiments can be combined with each other, so long as such combinations would not contradict one another.

What is claimed is:

1. A galleryless piston comprising:
a body portion formed of metal, said body portion including an upper wall including an undercrown surface, said undercrown surface being exposed when viewed from an underside of said piston, said upper wall including an upper combustion surface opposite said undercrown surface, a ring belt depending from said upper wall, a thermal barrier coating applied to at least a portion of said upper combustion surface,
said thermal barrier coating including a ceramic material, and said ceramic material of said thermal barrier coating including at least one of ceria stabilized zirconia and a mixture of ceria stabilized zirconia and yttria stabilized zirconia in an amount of 90 to 100 wt. %, based on the total weight of said ceramic material,
said thermal barrier coating has a metal bond material including a superalloy disposed between said ceramic material and said upper combustion surface,
said thermal barrier coating gradually transitions from 100 wt. % of said metal bond material to 100 wt. % of said ceramic material based on the total weight of said thermal barrier coating,
an uppermost portion of said thermal barrier coating is formed entirely of said ceramic material, and
said thermal barrier layer has a thickness of less than 500 microns.

2. A galleryless piston according to claim 1, wherein said body portion is formed of a single piece of steel, a pair of pin bosses depend from said upper wall, and a pair of skirt panels depend from said ring belt and are coupled to said pin bosses, a plurality of struts couple said skirt panels to said pin bosses, said body portion presents an inner undercrown region extending along said undercrown surface and surrounded by said skirt panels and said struts and said pin bosses, a pair of undercrown pockets extend along said undercrown surface, each undercrown pocket is surrounded by one of said pin bosses and one of said skirt panels and said struts coupling said one pin boss to said one skirt panel, and said body portion does not have a cooling gallery floor or other features bounding or partially bounding a cooling gallery along said undercrown surface.

3. A galleryless piston according to claim 2, wherein said ceramic material includes said ceria in an amount of 90 to 100 wt. %, based on the total weight of said ceramic material.

4. A galleryless piston according to claim 1, wherein said ceramic material of said thermal barrier coating includes ceria stabilized zirconia.

5. A galleryless piston according to claim 3, wherein said ceramic material includes said ceria stabilized zirconia in an amount of 90 to 100 wt. %, based on the total weight of said ceramic material.

6. A galleryless piston according to claim 1, wherein said ceramic material of said thermal barrier coating includes a mixture of ceria stabilized zirconia and yttria stabilized zirconia.

7. A galleryless piston according to claim 5, wherein said ceramic material includes said mixture in an amount of 90 to 100 wt. %, based on the total weight of said ceramic material.

8. A method of manufacturing a galleryless piston comprising:

applying a thermal barrier layer to a body portion of a piston, the body portion of the piston being formed of metal, the body portion including an upper wall including an undercrown surface, the undercrown surface being exposed when viewed from an underside of the piston, the upper wall including an upper combustion surface opposite the undercrown surface, the body portion including a ring belt depending from the upper wall, the thermal barrier coating being applied to said upper combustion surface and including a ceramic material, the ceramic material of the thermal barrier coating including at least one of ceria stabilized zirconia and a mixture of ceria stabilized zirconia and yttria stabilized zirconia in an amount of 90 to 100 wt. %, based on the total weight of said ceramic material, the thermal barrier coating includes a metal bond material containing a superalloy disposed between the ceramic material and the upper combustion surface, the thermal barrier coating gradually transitions from 100 wt. % of the metal bond material to 100 wt. % of the ceramic material based on the total weight of the thermal barrier coating, an uppermost portion of the thermal barrier coating is formed entirely of the ceramic material, and the thermal barrier layer has a thickness of less than 500 microns.

9. A method according to claim 7, wherein the step of applying the thermal barrier coating includes thermal spraying.

10. A method according to claim 8, wherein the thermal spraying step includes plasma spraying or high velocity oxy-fuel (HVOF) spraying.

* * * * *